Oct. 9, 1951     R. R. HULL     2,570,681
LIQUID MEASURING AND DISPENSING DEVICE
Filed May 4, 1948     3 Sheets-Sheet 1
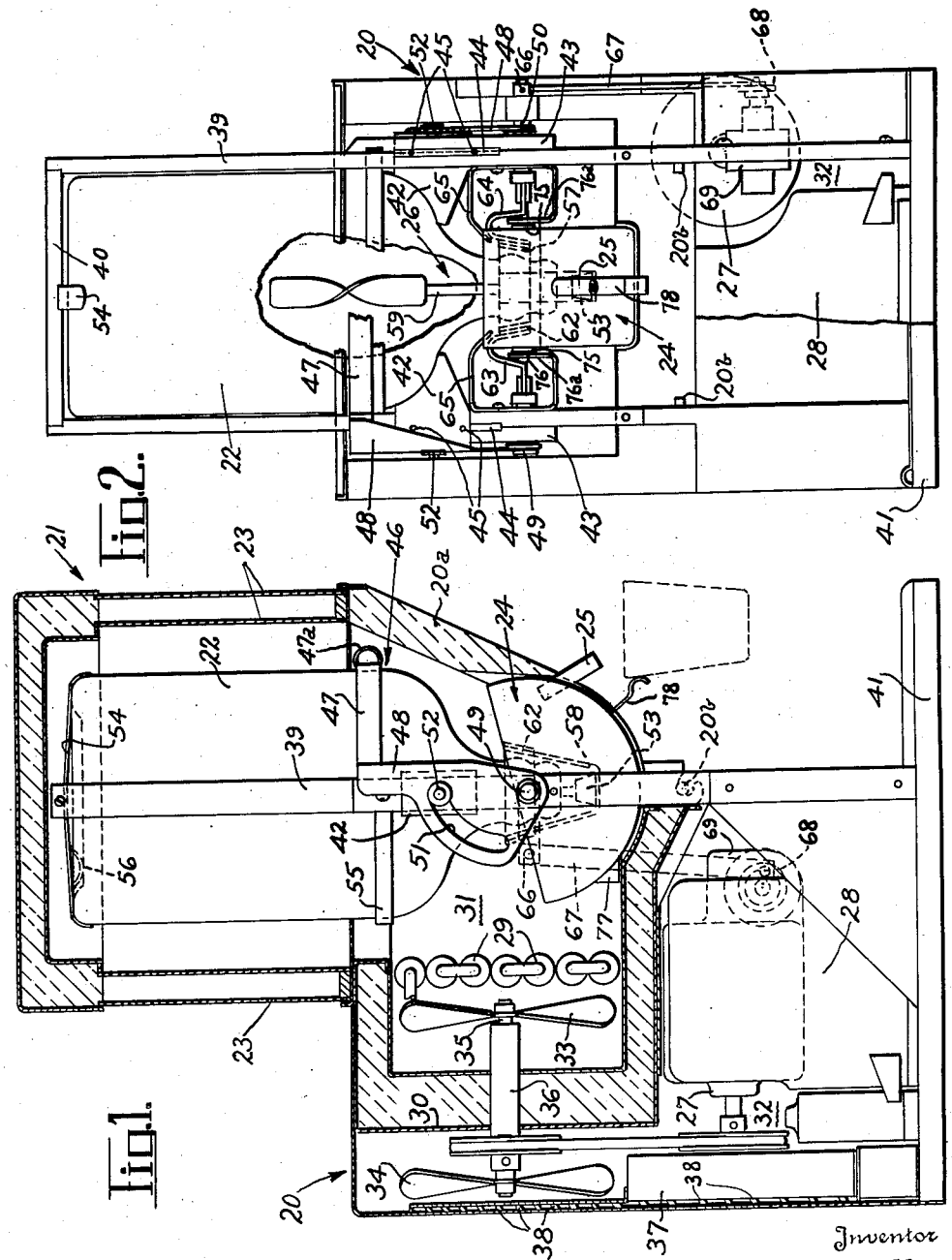
Inventor
Robert R. Hull.
By Roy F. Steward
his Attorney

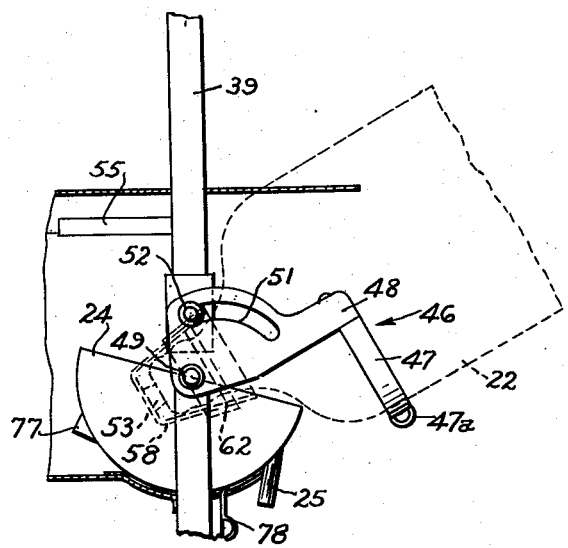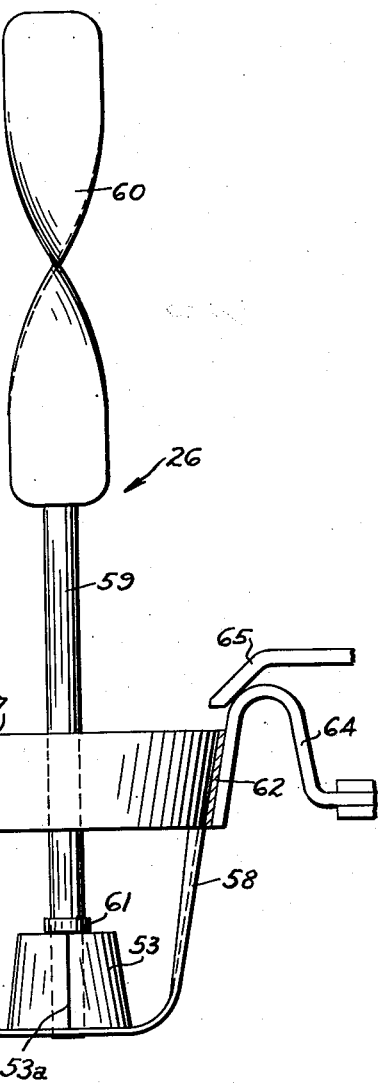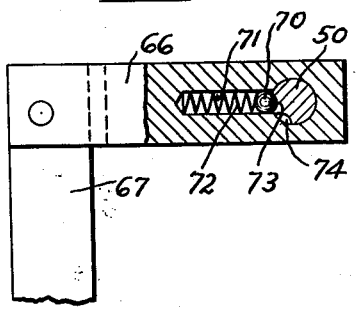

Oct. 9, 1951  R. R. HULL  2,570,681
LIQUID MEASURING AND DISPENSING DEVICE
Filed May 4, 1948  3 Sheets-Sheet 3

Inventor
Robert R. Hull.
By Roy F. Steward
his Attorney

Patented Oct. 9, 1951

2,570,681

UNITED STATES PATENT OFFICE 2,570,681

LIQUID MEASURING AND DISPENSING DEVICE

Robert R. Hull, Pasadena, Calif., assignor to California Fruit Growers Exchange, Los Angeles, Calif., a corporation of California Application May 4, 1948, Serial No. 24,963

11 Claims. (Cl. 222—353)

The present invention relates to a liquid measuring and dispensing device; more particularly, it relates to a device for dispensing a consumer portion of a beverage from a reservoir therefor. The device is particularly suited for the temporary storage and dispensing of fruit juices, buttermilk and the like, which contain solid matter in suspension and consequently require constant agitation to keep such solid matter uniformly dispersed throughout the body of the liquid.

It is an object of the invention to provide a small, compact, self-contained unit which can be placed upon a store or restaurant counter without causing undue interference with other equipment. With the exception of an electric power cord, no installation connections of any kind are required and portability of the unit is thereby afforded.

It is a further object to include in the unit refrigerating or heating means in order that cold or hot beverages may be served.

A further object is to provide a dispenser which may be actuated by a customer and which will automatically dispense a controlled or measured volume of beverage into the customer's glass or cup. By novel means hereinafter described, parts of the dispensing control mechanism may be readily exchanged by an operator having access to the interior of the unit whereby the volume dispensed by the unit upon each actuation by a customer can be changed to suit the particular needs. Or, if desired, by removing a part of this dispensing control mechanism entirely, the amount of liquid dispensed can be determined by the customer's own wishes.

The unit consists essentially of a reservoir within which the beverage is stored and a dispensing-control container into which said reservoir feeds and from which a customer may withdraw a portion of beverage. The reservoir is preferably an inverted carboy or bottle and is supported upon a frame at such height that the mouth of the bottle is positioned at substantially the desired level of the liquid to be maintained in the container. The beverage feeds by gravity from the bottle and the level of liquid in the container is controlled by the air seal formed at the bottle mouth in conventional manner.

In the form of the invention now preferred, this container is divided into a constant-level chamber, and a dispensing-control or measuring chamber to which the former supplies beverage under certain conditions described hereinafter. This latter chamber determines the amount of beverage dispensed during a cycle of dispensing operation. The dispensing chamber and the incorporated constant-level chamber are mounted upon the aforesaid apparatus frame to form a feed control pan which is capable of tilting movement backward and forward between limiting positions. A delivery spout is provided in the dispensing chamber which is effective to permit gravity outflow of beverage from this chamber whenever the latter is tilted forward and held in its dispensing position.

A particularly novel feature of the combined constant-level and dispensing-control container is to be found in the fact that the beverage contained in the supply bottle or reservoir as well as in the constant-level chamber may be completely isolated from the dispensing chamber whenever actual dispensing to a customer occurs. This is accomplished in the present example by providing a weir or outlet in the wall of the constant-level chamber, which weir is maintained at an effective level higher than the predetermined constant level of the liquid in the constant-level chamber upon tilting movement of the container towards dispensing position. Because of this, the capability of the present unit for accurately controlling the amount of beverage dispensed far exceeds that of any generally similar device heretofore known. And this is accomplished without at the same time entailing the use of highly complicated, delicate mechanisms not easily adjusted or maintained.

Another object of the invention is to provide a simple means for stirring the beverage within the supply bottle where the beverage contains some solid matter, as, for example, fruit juices, buttermilk or chocolate, to prevent the solids from settling out. For this purpose, an agitator projects centrally through the neck opening or mouth into the interior of the bottle. The agitator is connected externally of the bottle to a source of driving power and is caused to oscillate back and forth within the bottle to keep the solids in suspension.

In order to eliminate the normally somewhat messy operations, due to inadvertent spillage, of inverting and positioning a liquid feeding device of this general type, the present invention provides means for closing or opening the mouth of the reservoir while the latter is in its inverted position in the machine. Thus, a full or partially full supply bottle may be inverted and placed into the machine while still stoppered or capped, after which the closure may be removed to permit the flow of liquid from the bottle.

Similarly, should it be desired to remove a partially filled bottle from the machine, the closure may be reapplied to the bottle and the latter then lifted out of the machine without any danger of spillage. The means for applying or removing the closure, which will be described in detail hereinafter, is controllable completely externally of the feed control pan into which the mouth of the bottle projects, thus eliminating problems of contaminating the beverage in the control pan.

Further objects of the invention are to provide a unit of neat and attractive appearance which will permit the beverage in the supply bottle to be readily viewed by the customer at all times; to eliminate complicated mechanisms which are delicate to adjust and hard to maintain; and to provide a unit which is easily kept in sanitary condition.

Other novel features and advantages will be apparent from the description of a preferred embodiment of the invention which is shown in the accompanying drawings, in which Fig. 1 is a side elevational view, partly in section, of the complete dispensing unit with the supply bottle in position to dispense;

Fig. 2 is a front elevational view, partly in section, of the apparatus shown in Fig. 1 with the dome and front panel removed;

Fig. 3 is a fragmentary view in side elevation, partly in section, of parts shown in Fig. 1 in which the supply bottle is shown in position to be installed in or removed from the unit;

Fig. 4 is an enlarged fragmentary view, partly in section, of a bottle cork and agitator supporting mechanism;

Fig. 5 is a detailed view, partly in section, of an agitator drive clutch mechanism;

Figure 6:
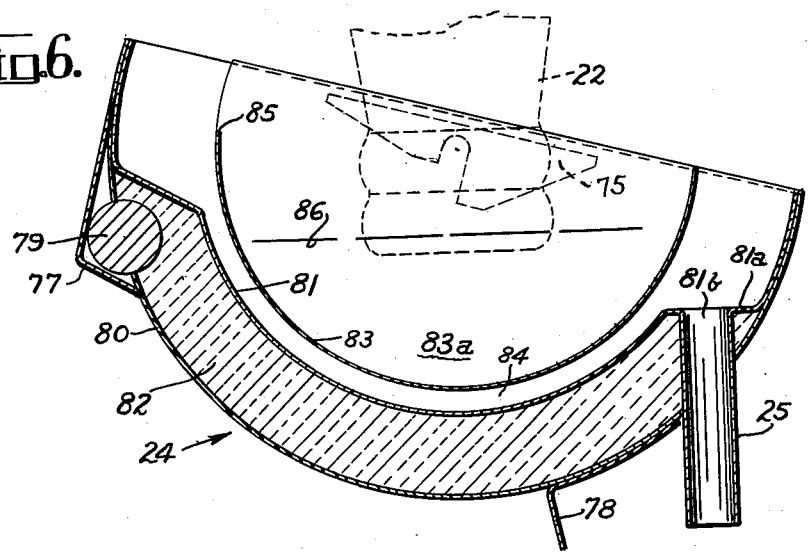
Figs. 6 and 7 are diagrammatic views in side elevation of a tiltable dispensing-control pan.

In the preferred embodiment of the invention illustrated in the drawings, the device consists essentially of a main portion which is enclosed within a cabinet indicated generally at 20, and a removable dome or bell 21 resting upon the top of the cabinet. An inverted liquid supply bottle or primary container 22 is positioned within the device so as to project upwardly through an aperture in the top of cabinet 20 and into dome 21. In this instance, dome 21 is composed of double walls of transparent material 23 such as glass or a suitable plastic to permit the contents of the bottle to be viewed from the outside of the device. Bottle 22 feeds into a pivotally mounted feed control pan or secondary container 24 which controls the flow of liquid from the bottle and also enables a customer to withdraw a portion of liquid. A delivery spout 25 on feed control pan 24 is provided for this latter purpose. In addition, an agitating means indicated generally at 26 extends upwardly into bottle 22 through its neck and is actuated through various power transmitting connections by motor 27. The device is provided with a refrigerating unit 28 which supplies refrigerant to cold-coils 29 adjacent the rear of control pan 24 (i. e. to the left in Fig. 1). Cabinet 20 is divided interiorly by an insulating wall 30 to provide, in conjunction with dome 21, a refrigerated compartment 31 surrounding the feed control pan and supply bottle, and a utility compartment 32 within which the refrigerating unit and agitator drive motor are enclosed. Wall 30 serves the dual function of thermally isolating the liquid dispensing components from the rest of the cabinet and preventing contamination of the liquid due to the operation of the refrigerating and agitating motors. Air circulating fans 33 and 34, located in compartments 31 and 32, respectively, are mounted on opposite ends of a stub shaft 35 which is carried in a bearing sleeve 36 projecting through the rear of wall 30. These fans are driven by a belt and pulley connection from motor 27. Fan 33 serves to circulate cooled air around bottle 22 and control pan 24, while fan 34 supplies air to the refrigerating condenser 37. Louvres 38 are provided in the rear wall of cabinet 20 to permit air to be drawn into the upper portion of compartment 31 and to be directed downwardly by baffles, not here shown, to cause it to pass out of the compartment through condenser 37. A hinged, removable panel 20a, pivoted at 20b, swings downwardly and lifts off pivots 20b to permit access to the interior of refrigerated compartment 31.

Referring more particularly to Figs. 1 and 2, a frame consisting of a pair of uprights 39 and a cross-brace 40 is rigidly supported upon a base 41. This frame in turn supports bottle 22 and the various dispensing and agitating mechanisms which are suspended between uprights 39. Bottle 22 is normally carried in its inverted position between the uprights by opposed pairs of shoulder brackets 42 which are suitably contoured on their upper edges to receive the shoulder portion of the bottle. Each bracket 42 is U-shaped when viewed from above and slidably engages an upright 39. A reinforcing post 43 is secured to each upright 39 to form a slot 44 between the posts and the uprights. A pair of roller pins 45, bridging opposite legs of each bracket 42, is confined within these slots and serves to guide brackets 42 for vertical movement within the limits of slots 44. Raising or lowering brackets 42 will of course raise or lower the bottle carried by them, which movement is desired in connection with the operations of bottle exchange described more fully hereinafter.

Vertical movement of brackets 42, and consequently bottle 22, is accomplished by means of a bottle raising assembly 46 comprising a semicircular band 47 secured at its opposite ends to side plates 48. Plates 48 are pivotally mounted on uprights 39 by pivot shafts 49 and 50 which extend through the uprights and reinforcing posts 43. Arcuate slots are cut in each plate 48 to provide cam tracks 51 within which studs 52 brazed to brackets 42 are guided. Brackets 42 are thus caused to be raised and lowered with angular movement of assembly 46. It will be noted that the arc of tracks 51 is so disposed in plates 48 as to cause brackets 42 to be moved to their highest position on uprights 39 when bottle raising assembly 46 is in its upper position, as shown in Fig. 1. In this condition, which is the normal operating condition of the device, bottle 22 is raised about one to one and a quarter inches from the position it occupies when assembly 46 is pivoted to its lower or bottle receiving position. The vertical movement thus imparted to the bottle is employed to effect the application or removal, alternatively, of a closure device at the mouth of the bottle by moving the bottle toward or away from this closure while the latter is maintained in a relatively fixed position. In the embodiment of the invention here shown, this closure comprises a rubber stopper or cork 53.

In order to assist shoulder brackets 42 and band 47 in maintaining bottle 22 securely positioned within the dispensing device during normal operation, and at the same time, to permit it to be removed or replaced as readily as possible, there is provided a retaining spring 54 at the upper end of the bottle (i. e., the base of the bottle, since it is in an inverted position) and a retaining band 55 at the back near the bottle shoulder. In addition, an auxiliary retaining spring 56 engages the inner rim of the bottle base, as shown in Fig. 1. Springs 54 and 56 are secured to cross-brace 40 and press downwardly on the base of bottle 22 thus forcing it snugly against the seat provided by brackets 42. This action also causes pins 52 on brackets 42 to be pressed firmly into slight depressions formed at the upper ends of cam tracks 51, thus ensuring a positive latching of assembly 46 in its upper position. Spring 54 engages the base of the bottle when the latter is in its uppermost position only, and is designed to hold the bottle from tipping transversely of the plane passing through uprights 39. Auxiliary spring 56, which extends rearwardly from cross-brace 40, is formed so as to engage the inner rim of the bottle base in either the upper or lower positions of the bottle. This spring serves as a temporary detention to prevent the bottle from accidentally tipping and falling out of the apparatus while an operator is exchanging bottles.

When it is desired to remove the bottle, this may be accomplished by lifting dome 21 from the top of the unit and swinging front access panel 20a down, after which assembly 46 can be swung downwardly by pulling on handle 47a. This action lowers bottle 22 onto stopper 53 causing it to be forced into the mouth of the bottle. At this point, the bottle is retained at its upper end by spring 56 only and it may then be tipped forwardly at its top against the retentive action of the spring until it rests in the cradle or slide-rest provided by band 47 of assembly 46, as shown in Fig. 3. The bottle may then be removed by sliding it forwardly and upwardly at a slight incline out of the aforesaid cradle.

Maintaining cork 53 in a fixed position during the raising or lowering of the bottle by assembly 46 is accomplished by making it an integral part of agitator means 26. Referring to Fig. 4, this means consists of a supporting ring 57 which is generally frusto-conical in form and to which a stirrup 58 is secured so as to extend downwardly from the lower edge. A rod 59, made fast at its lower end to stirrup 58, projects centrally upward through ring 57 and is provided at its upper end with a spiral agitating paddle 60. Cork 53 is bored centrally and slit along one side only to the bore, as at 53a, to permit it to be slipped laterally onto rod 59, as shown, where it is held closely against the base of stirrup 58 by a collar 61 on rod 59. The agitator is placed on bottle 22 before the latter is inverted by inserting paddle 60 and its supporting rod 59 into the mouth and pressing down until cork 53 fits snugly in the neck of the bottle. In this manner, ring 57 is supported by stirrup 58 so as to encircle the neck of the bottle externally at a distance of about an inch or more from the mouth. The purpose of thus positioning ring 57 will be explained hereinafter. With bottle 22 thus stoppered, it can then be freely inverted and slid into the cradle formed by assembly 46 without danger of spilling any liquid. As this is done, ring 57 is caused to nest within an agitator drive ring 62, similar to ring 57, which is pivotally suspended between uprights 39 by means of arched trunnions 63, 64, brazed to opposite sides of the ring. These trunnions, in turn, are carried by the inner ends of pivot shafts 49 and 50, trunnion 64 being made fast with pivot shaft 50 so as to cause drive ring 62 to be tipped or oscillated with angular movement of shaft 50. Since it would not be convenient, in assembling agitator 26 with the bottle prior to installation in the machine, to predetermine the axis in the plane of ring 57 about which oscillation of the agitator is to occur, the design is such as to permit sufficient clearance between ring 57 or stirrup 58 and the neck of the bottle for oscillation of the agitator about any axis in such plane.

In placing the supply bottle into the dispensing unit, flow control pan 24 and the agitator drive ring 62 are first tipped or rocked forwardly on their respective axes, as seen in Fig. 3, to permit the bottle to be slid into place. As thus positioned, drive ring 62 is moved out from under a pair of oppositely disposed overhanging brackets 65 which are secured to uprights 39, and the mating of agitator support ring 57 with ring 62, as the bottle is placed in the machine, is readily effected. As the bottle is pushed or tipped up into its normal vertical position, however, drive ring 62 as well as support ring 57 pass under the overhanging ends of brackets 65. Then, as the bottle is raised by assembly 46, any appreciable lifting of agitator 26, because of frictional engagement between stopper 53 and the mouth of the bottle, is prevented by the abutment of support ring 57 against the overhanging ends of brackets 65, as seen best in Figs. 2 and 4. Since the cork 53 is prevented from sliding upwardly on rod 59 by collar 61, it is withdrawn from the bottle as the latter is raised away from the agitator device. This, of course, permits the liquid to flow from the thus unstoppered bottle into flow control pan 24 until the liquid level in the pan rises above the neck opening of the bottle and forms an air seal preventing further outflow. It is to be noted that, in the normal operating condition of the unit, a small clearance is maintained between the overhanging ends of brackets 65 and agitator rings 57 and 62 so that oscillation of the agitator can occur. Hence, in the aforesaid operation of withdrawing stopper 53 during insertion of a fresh bottle, agitator 26 will probably be lifted to the extent permitted by the abutment of ring 57 and brackets 65. However, when cork 53 has been completely withdrawn, assembly 26 will then drop back into nesting engagement in drive ring 62.

By the withdrawal of cork 53 from the bottle, the agitator assembly is then freed for oscillation back and forth by rocking movement of drive ring 62. Such rocking movement is imparted to the ring by means of a crank arm 66 mounted on the outer end of shaft 50. The upper end of a connecting rod 67 is pivotally attached to arm 66, while the lower end of this rod connects to a plate crank 68. The latter is driven through a speed reducing unit 69 from motor 27. As shown in Fig. 5, arm 66 is not made fast with the end of shaft 50 but is operatively connected to it by means of a spring-loaded ball-clutch mechanism contained in the arm. This clutch consists of a small ball 70 confined within a drilled passage 71 in arm 66 and a spring 72 presses this ball into detents or recesses 73, 74, provided in shaft 50. These two recesses are so arranged on shaft 50 as to maintain drive ring 62 in a horizontal position at the center point of the throw of plate crank 68 when detent 73 is engaged, and at an inclination of about 60° forward from the horizontal when detent 74 is engaged. The latter position facilitates the step of installing a fresh bottle by centering the throw of agitator drive ring 62 on the central longitudinal axis of the bottle which is be'ng inserted into the machine. The fact that the apparatus may still be running and therefore causing ring 62 to oscillate does not interfere in any material respect with the insertion of ring 57 since the ball-clutch permits the oscillation of ring 62 to be interrupted at any time. Also, since agitator 26 is not free to move appreciably within the bottle prior to the removal of the stopper, some provision must be made to disengage the agitator driving mechanism to allow for the necessary tilting movement of bottle 22 attendant upon the aforesaid operations of bottle exchange, and the ball-clutch just described serves this purpose as well.

As mentioned above, agitator support ring 57 is positioned by means of stirrup 58 to encircle the bottle neck about an inch above the neck opening. This places the axis of oscillation of the agitator assembly 26 approximately midway between the longitudinal limits of the restricted neck portion of the bottle and thereby permits a substantially greater angular displacement of the agitator within the primary container than would be possible if the agitator were pivoted at the lower extremity of rod 59. This arrangement also provides agitation within the secondary container or feed control pan 24 by the projection of stirrup 58 downwardly into the pan. A further advantage of this arrangement is the fact that the agitating means for both the primary and secondary containers is supported completely externally of either container, a very desirable feature in eliminating the possibility of contaminating the beverage by contact with bearing surfaces.

Flow control pan 24 comprises a generally semi-cylindrical open trough having a pivot bearing 75 located on either side axially of the trough. The pan is supported by these bearings upon pivot pins 76 secured to the upstanding arm portions 76a formed in the lower part of brackets 65. Pan 24 is freely oscillatable for angular movement on pivots 76 within limits determined by a back-stop 77, on the lower periphery of the pan, which abuts against partition 30 in the normal or non-dispensing position of pan 24, and a front-stop 78, also on the lower periphery of the pan, which abuts against the lower portion of front panel 20a in the full dispensing position. Stop 78 also serves as a depress lever against which the customer pushes the edge of his glass or cup to pivot pan 24 into dispensing position, an elongated slot being provided in the face of panel 20a to permit movement of this lever and dispensing spout 25. Pan 24 is yieldably retained in the non-dispensing position by a counterweight 79 secured to the pan adjacent stop 77.

Figure 7:
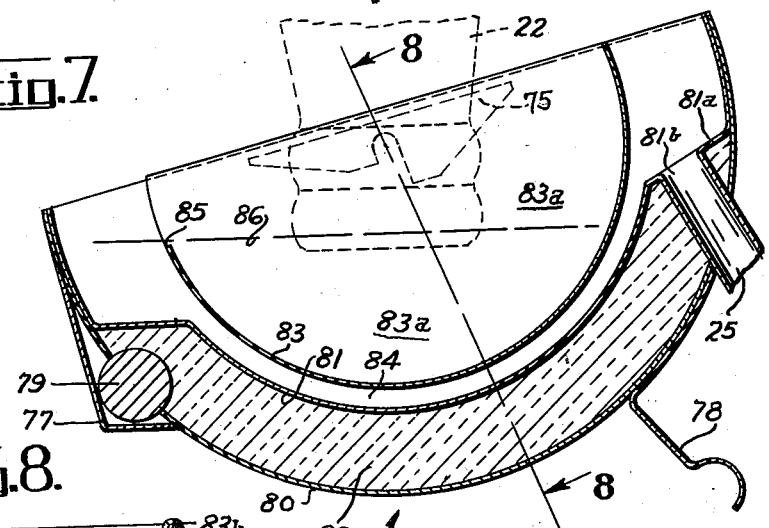
Figure 8:
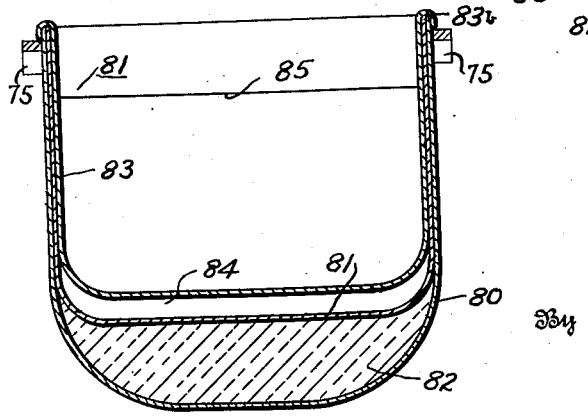
Fig. 8 is an end view of this pan taken on line 8—8 of Fig. 7.

As shown in Figs. 6 through 8, pan 24 is composed of an outer shell 80 and an inner shell 81, the latter being in close contact along its sides with the side walls of shell 80. Shell 81 is also in contact with the outer shell along the upper front and rear edges of the latter, these being to the right and left, respectively, in Figs. 6 and 7, but is formed intermediate these points to provide an annular space 82 between the two shells in the lower portion of the pan. This lower portion is normally exposed to the outside air temperature, as seen in Fig. 1, and space 82 is therefore filled with a thermal insulating material to insulate the beverage held in pan 24 from being affected by this temperature. A further purpose of forming shell 81 in the manner shown is to provide a shelf 81a at the front of the pan which is completely flooded with relatively small angular movement of the control pan. This serves to ensure rapid delivery of the beverage portion to be dispensed, as well as providing other advantages hereinafter mentioned. Spout 25 projects upwardly through the periphery of the pan to connect with an outlet 81b provided in shelf 81a.

Pan 24 is also divided interiorly by a baffle 83 forming a semicylindrical trough 83a which serves as the constant-level chamber for controlling the feeding of liquid from the supply bottle. Baffle 83 fits snugly at its sides within inner shell 81 and is supported concentrically therein by outwardly curled upper edges 83b which engage the upper edges of pan 24 along opposite sides. The diameter of baffle 83 is somewhat smaller than that of the minimum diameter of shell 81 and an annular space or measuring chamber 84 is formed between the shell and the baffle. At its rear edge (i. e., to the left of Figs. 6 and 7), baffle 83 is notched downwardly to form a weir 85.

As previously mentioned, the neck of bottle 22 projects downwardly into pan 24 a short distance and after cork 53 has been withdrawn the beverage flows from the bottle into the pan until the level in the pan rises sufficiently to close off the neck opening and to form an air seal preventing further flow of beverage to the pan. Bottle 22 is suspended in its normal operating position at such height with respect to flow control pan 24 as to cause the liquid in the pan to rise to the level indicated at 86. For a control pan having an external diameter of approximately 7¼ inches, the bottle should preferably be positioned so as to cause level 86 to be about ⅛ of an inch below the axis of pivot bearing 75. This level is, of course, maintained substantially constant at all times by the action of the air seal in conventional manner. As shown in Fig. 7, which represents diagrammatically the normal or non-dispensing position of the flow control pan, level 86 is slightly above the upper edge of weir 85, the distance found in practice to be satisfactory being on the order of one-eighth of an inch. In this condition, therefore, beverage delivered by bottle 22 to the inner trough or constant-level chamber 83a formed by baffle 83 flows over the edge of weir 85 and into chamber 84 between the baffle and shell 81 until the level in both chambers reaches the same height. No further flow can then occur since an equilibrium condition has been established.

When it is desired to have the apparatus dispense a portion of beverage, the control pan is tipped into the position shown in Fig. 6 by pressing a receptacle against lever 78 as previously described. Since the upper edge of weir 85 is at a substantial distance radially from the pivotal axis of the control pan, a small angular displacement of the pan causes a relatively large vertical movement of the edge of the weir. In all practical effects, therefore, the edge of weir 85 is raised above level 86 almost at the same instant that any movement of pan 24 towards dispensing position occurs. Thus, liquid contained in constant-level chamber 83a is isolated by baffle 83 from that in chamber 84 and its level remains constant, regardless of the level in space 84, during the full time that pan 24 is tipped out of its normal position. As continued tipping of pan 24 occurs, the outlet 81b in shell 81 is moved below the level of the liquid in chamber 84 and liquid is dispensed from the spout. The dispensing action stops, of course, when the liquid in chamber 84 falls to a point level with the outlet in shell 81. When the control pan is released again, it is returned to its normal position by weight 79. Since liquid has been drained from chamber 84 so as to lower the level therein, a flow will again occur over weir 85, thus temporarily lowering the level in chamber 83a and permitting more liquid to feed from the supply bottle until equilibrium is again established.

It is apparent from the foregoing that the amount of liquid dispensed for any cycle of operation is determined by the size of chamber 84. Therefore, if it is desired to change the amount of beverage dispensed per cycle, this is readily accomplished by replacing baffle 83 with one of a different diameter, the smaller the diameter, the larger the portion of beverage dispensed. Or, if desired, baffle 83 may be removed entirely, in which case the amount of beverage delivered from spout 25 will be determined by the length of time during which the control pan is held in its dispensing position.

A particularly desirable advantage of the flow control pan herein disclosed over that of prior devices is that a condition of "full flow" from spout 25 is attained with an extremely small angular displacement of the control pan. This is accomplished to a large extent because of the particular design of shell 81 here shown in which shelf 81a causes outlet 81b to be completely flooded or unflooded with very slight movement of the pan. This design has the further advantage of reducing the amount of "after-dripping" commonly encountered in dispensing apparatus in the prior art. Furthermore, by the use of baffle 83, complete isolation of the liquid contained by it from that which is actually being dispensed during any particular dispensing cycle affords an extremely simple and foolproof means of accurately determining the exact amount of beverage to be delivered. Since no liquid can feed from bottle 22 until after the dispensing operation is entirely completed, variations in the amount delivered due to bottle surging are eliminated.

The foregoing description has been limited, for the purpose of illustration, in the application of the inventive concept herein disclosed to the dispensing of refrigerated beverages. It is to be understood, of course, that the principles of this invention are not so limited but may be applied to the dispensing of liquid of various types, whether refrigerated, heated or at room temperature. Furthermore, the unit may conveniently include coin-control mechanism whereby completely automatic, customer-operated, controlled dispensing is afforded.

What is claimed is:

1. Liquid dispensing apparatus comprising a frame, an inverted liquid-supply bottle positioned on said frame; means supporting said bottle from said frame and permitting vertical movement of the bottle between a lower and an upper position thereon; a container mounted on said frame subadjacent the mouth of said bottle into which the bottle feeds by gravity flow; a closure at the mouth of said bottle, which closure in the lower position of said bottle prevents gravity flow of liquid therefrom; means for supporting said closure from said frame and for rendering it substantially incapable of vertical movement with respect to said frame; and means for raising said bottle while supported in inverted position to effect the removal of said closure from the mouth of said bottle thereby permitting gravity flow of liquid to said container.

2. Liquid dispensing apparatus as defined in claim 1, in which said means for supporting said closure is an agitator device including an agitator blade, the latter extending upwardly through the mouth of said bottle into the body thereof; said device being pivotally supported on said frame adjacent the mouth of said bottle to permit angular displacement of said blade between fixed limits within the body of said bottle after said bottle has been raised to its upper position to effect withdrawal of said closure.

3. Liquid dispensing apparatus as defined in claim 2, in which the pivotal axis of said agitator device intersects the central longitudinal axis of said bottle at a point substantially midway the length of the neck portion of said bottle.

4. Liquid dispensing apparatus as defined in claim 2, in which said agitator device also includes a downwardly extending portion projecting into said container below the mouth of said bottle.

5. Liquid dispensing apparatus as defined in claim 2, which includes a motor, and driving connections between said motor and said agitator device for oscillating said device back-and-forth between fixed angular limits.

6. Liquid dispensing apparatus as defined in claim 1, in which the bottle raising means includes a pair of oppositely disposed interconnected cam plates pivotally mounted on said frame, said plates having arcuate cam surfaces formed thereon; a pair of oppositely disposed bottle supporting brackets slidably engaging said frame for limited vertical movement thereon, each of said brackets having a stud operatively engaging the cam surface of a cam plate and being adapted and arranged to be moved vertically with pivotal movement of said cam plates to move said bottle to said upper or lower positions.

7. In liquid dispensing apparatus, the combination which comprises a primary container for storing a supply of liquid; a secondary container for receiving liquid from said primary container and from which a portion may be dispensed; said primary container having a single outlet which is disposed below a predetermined level of liquid in said secondary container to maintain such level substantially constant by gravity flow from said primary container; an agitator extending upwardly into said primary container through said outlet for oscillatory angular displacement within and independent of said container; and a member for supporting said agitator, said member being pivotally mounted independently and externally of either container for oscillation about a horizontal axis disposed in a plane above the outlet of said primary container but having a portion extending downwardly below said outlet to which said agitator is attached.

8. In liquid dispensing apparatus, the combination as set forth in claim 7, in which said primary container is an inverted bottle having a restricted neck portion, and the axis of oscillation of said supporting member intersects the central longitudinal axis of said bottle at an intermediate point in the length of such restricted neck portion.

9. In liquid dispensing apparatus, the combination as set forth in claim 8, in which said axis of oscillation intersects the central longitudinal axis of said bottle at a point substantially midway the length of the neck portion of said bottle.

10. Liquid dispensing apparatus having a liquid receiving and discharging container, an agitator mounted on a shaft for oscillation within said container, a crank arm mounted on said shaft for oscillating the same, a connecting rod for driving the crank arm and normally swinging the agitator through an arc, a ball clutch including a recess in said shaft and a spring loaded ball engaging said recess during operation of the agitator with the container in place.

11. Liquid dispensing apparatus as defined in claim 10, in which said shaft is provided with a second recess, engageable by said spring loaded ball for swinging the agitator through a different arc during placement and removal of the container.

ROBERT R. HULL.

REFERENCES CITED

The following references are of record in the file of this patent:

UNITED STATES PATENTS

| Number | Name | Date |
|---|---|---|
| 853,125 | Schaffer et al. | May 7, 1907 |
| 1,631,430 | Schrieber | June 7, 1927 |
| 2,325,441 | Tucket et al. | July 27, 1943 |